United States Patent
Nagami

(10) Patent No.: US 8,982,311 B2
(45) Date of Patent: Mar. 17, 2015

(54) LIQUID CRYSTAL DISPLAY DEVICE

(71) Applicant: Japan Display East Inc., Mobara (JP)

(72) Inventor: Takahiro Nagami, Mobara (JP)

(73) Assignee: Japan Display East Inc., Tokyo (JP)

(*) Notice: Subject to any disclaimer, the term of this patent is extended or adjusted under 35 U.S.C. 154(b) by 152 days.

(21) Appl. No.: 13/721,274

(22) Filed: Dec. 20, 2012

(65) Prior Publication Data

US 2013/0162927 A1 Jun. 27, 2013

(30) Foreign Application Priority Data

Dec. 22, 2011 (JP) ................... 2011-281066

(51) Int. Cl.
*G02F 1/1339* (2006.01)
*G02F 1/1343* (2006.01)
*G02F 1/136* (2006.01)
*G02F 1/1368* (2006.01)

(52) U.S. Cl.
CPC ............ *G02F 1/1339* (2013.01); *G02F 1/1368* (2013.01); *G02F 1/13394* (2013.01); *G02F 1/134363* (2013.01)
USPC ............................... 349/156; 349/43; 349/141

(58) Field of Classification Search
CPC ............ G02F 1/1368; G02F 1/136227; G02F 1/134363; G02F 2001/134318; G02F 1/13394
USPC .................... 349/43, 141, 155, 156
See application file for complete search history.

(56) References Cited

U.S. PATENT DOCUMENTS

| | | | | |
|---|---|---|---|---|
| 6,094,250 A * | 7/2000 | Choi et al. | ........... | 349/141 |
| 6,462,800 B1 * | 10/2002 | Kim et al. | ........... | 349/143 |
| 7,782,435 B2 * | 8/2010 | Lim | ........... | 349/141 |
| 8,790,941 B2 * | 7/2014 | Kim et al. | ........... | 438/30 |
| 2002/0075443 A1 | 6/2002 | Shimizu et al. | | |
| 2007/0146618 A1 | 6/2007 | Hashimoto | | |
| 2008/0111964 A1 * | 5/2008 | Shirasaka et al. | ........... | 349/155 |
| 2009/0289260 A1 | 11/2009 | Sonoda et al. | | |
| 2011/0122357 A1 * | 5/2011 | Chang et al. | ........... | 349/155 |
| 2011/0181825 A1 * | 7/2011 | Ma | ........... | 349/155 |

FOREIGN PATENT DOCUMENTS

| | | |
|---|---|---|
| JP | 2002-182220 | 6/2002 |
| JP | 2007-178652 | 7/2007 |
| JP | 2009-282262 | 12/2009 |

OTHER PUBLICATIONS

Birendra Bahadur, Liquid Crystals Applications and Uses, 1990, World Scientific, vol. 1, pp. 171-194.*

* cited by examiner

*Primary Examiner* — Edward Glick
*Assistant Examiner* — David Chung
(74) *Attorney, Agent, or Firm* — Lowe Hauptman & Ham, LLP

(57) ABSTRACT

A pixel electrode is formed on a TFT substrate, and a gate insulating film, an inorganic passivation film, a common electrode, and an alignment film are formed in this order thereover. A columnar spacer is formed to the counter substrate and is adapted to define a gap between the TFT substrate and the counter substrate. A through hole is formed in the gate insulating film of the TFT substrate, and the columnar spacer is disposed so as to cover a concave portion formed by the through hole. Since the area of contact between the columnar spacer and the TFT substrate is decreased, it is possible to suppress scraping of the alignment film and thus to prevent occurrence of bright spots.

5 Claims, 10 Drawing Sheets

LIQUID CRYSTAL DISPLAY DEVICE

CLAIM OF PRIORITY

The present application claims priority from Japanese Patent Application JP 2011-281066 filed on Dec. 22, 2011, the content of which is hereby incorporated by reference into this application.

BACKGROUND OF THE INVENTION

1. Field of the Invention

The present invention relates to a liquid crystal display device. The invention particularly relates to a liquid crystal display device taking measures to prevent bright spots caused by scraped dusts of an alignment film.

2. Description of the Related Art

Liquid crystal display devices includes: a TFT substrate having pixel electrodes, thin film transistors (TFT), etc. formed in a matrix; a counter substrate disposed in facing relation to the TFT substrate and having color filters, etc. formed at portions corresponding to the pixel electrodes of the TFT substrate; and liquid crystals put between the TFT substrate and the counter substrate. Images are formed by controlling the light transmittance of liquid crystal molecules for each pixel.

In the liquid crystal display device, an alignment film is formed at the boundary between the counter substrate and the liquid crystal layer in the TFT substrate, and the alignment film is subjected to rubbing process or optical alignment process to put the liquid crystal molecules to initial alignment. Then, the amount of light transmitted through the liquid crystal layer is controlled by twisting or rotating the liquid crystal molecules by electric fields from the initial alignment state.

Meanwhile, to control the thickness of the liquid crystal layer, it is necessary to form spacers between the counter substrate and the TFT substrate. Conventionally, beads, etc. were dispersed as the spacers in the liquid crystal layer. In recent years, however, to accurately control the gap between the TFT substrate and the counter substrate more accurately, columnar spacers are formed on the counter substrate and the gap is controlled by the columnar spacers.

On the other hand, use of the columnar spacer raises a new problem. That is, when a pressure is exerted from the outside on the counter substrate or a temperature cycle is applied to the liquid crystal display panel, an alignment film present between the columnar spacer and the TFT substrate is scraped and scraped dusts cause bright spots.

JP-2009-282262-A describes a configuration in which the scraping of an alignment film by a columnar spacer is decreased by forming a pedestal having an area smaller than the area at the top end of the columnar spacer facing a TFT substrate and decreasing the thickness of the alignment film on the pedestal. JP-2009-282262-A describes a material and a process of decreasing the thickness of the alignment film on the pedestal, particularly, when an alignment film obtained by so-called optical alignment is used.

JP-2002-182220-A describes a configuration in which a columnar spacer having a groove is formed to a counter substrate and a portion of a large height and a portion of a small height are formed in one columnar spacer. Usually, the portion of large height defines a gap between the TFT substrate and the counter substrate. The portion of the large height deforms elastically when pressure is exerted from the outside to the counter substrate or the like, and a portion of the small height disperses the stress by being in contact with the TFT substrate thereby preventing buckling of the columnar spacer and enabling sooner recovery after removal of the pressure.

JP-2007-178652-A describes a configuration in which a spherical spacer is fixed to a counter substrate, a concave portion is formed to a TFT substrate at a portion in contact with the spherical spacer thereby enlarging a margin when the counter substrate and the TFT substrate are stuck together and preventing light leakage caused by displacement in stacking.

SUMMARY OF THE INVENTION

View angle characteristics are important in liquid crystal display devices. The view angle characteristics result in a phenomenon that brightness or chromaticity changes between a case when a screen is observed from in front and a case when it is observed obliquely. In terms of view angle characteristics, an IPS (In Plane Switching) system in which liquid crystal molecules are operated by electric fields in a horizontal direction exhibits good characteristics.

While there are present various IPS systems, an IPS system of the configuration shown in FIG. 12 has been developed as a system in which the number of layers and the number of manufacturing processes are decreased. FIG. 12 is a cross sectional view of a TFT substrate. In FIG. 12, a pixel electrode is formed on a TFT substrate, a gate insulating film is formed over the pixel electrode, and an inorganic passivation film is formed thereover. A common electrode having slits is formed over the inorganic passivation film. A TFT comprising a gate electrode, a gate insulating film, a semiconductor layer, a drain electrode, and a source electrode is formed on the left of FIG. 12 and data signals are supplied from the source electrode of the TFT to a pixel electrode by way of a through hole formed in the gate insulating film. Liquid crystal molecules are rotated by electric fields formed between the common electrode and the pixel electrode, thereby controlling the transmittance of the liquid crystal layer to form images.

Also in the liquid crystal display device of such configuration, it is necessary to control the gap between the counter substrate and the TFT substrate by using spacers as in the existent liquid crystal display devices. The configuration also involves the same problem that bright spots are generated if scraping of the alignment film occurs between the spacer formed on the side of the counter substrate and the TFT substrate.

The present invention intends to attain an IPS system liquid crystal display device of high reliability that suppresses scraping of the alignment film without requiring any particular process in a structure for controlling the gap between the TFT substrate and a counter substrate by using columnar spacers.

The present invention intends to overcome the subject described above and provides a liquid crystal display device having the following typical means.

(1) A liquid crystal display device comprising: a TFT substrate having pixels formed in a matrix, the pixels each having a pixel electrode, a common electrode and a TFT; a counter substrate; a liquid crystal layer put between the TFT substrate and the counter substrate; and a columnar spacer formed to the counter substrate, the columnar spacer adapted to define a gap between the TFT substrate and the counter substrate. The pixel electrode is formed on the TFT substrate. A gate insulating film and an inorganic passivation film are formed in this order thereover. The common electrode having slits is formed over the inorganic passivation film. An alignment film is formed over the common electrode. The source electrode and the pixel electrode of the TFT are connected by way of a first through hole formed in the gate insulating film. A second through hole is formed in the gate insulating film at a portion where the columnar spacer is in contact with the TFT substrate. The top end of the columnar spacer is disposed so as to cover a concave portion formed to the TFT substrate by the second through hole.

(2) The liquid crystal display device according (1) above, in which an electrode is not present below the gate insulating film at the periphery of the second through hole.

(3) The liquid crystal display device described in (2) above in which the diameter at the top end of the columnar spacer is not less than 1.5 times as large as the diameter at the bottom of the concave portion formed to the TFT substrate.

(4) The liquid crystal display device described in (3) above in which the source electrode and the inorganic passivation film are present in the second through hole.

(5) The liquid crystal display device described in (3) above in which the source electrode is not present inside the second through hole and the source electrode is present at the periphery of the upper end of the through hole.

(6) A liquid crystal display device comprising: a TFT substrate having pixels formed in a matrix, the pixels each including a pixel electrode, a common electrode and a TFT; a counter substrate; a liquid crystal layer put between the TFT substrate and the counter substrate; and a columnar spacer formed to the counter substrate, the columnar spacer adapted to define a gap between the TFT substrate and the counter substrate. The pixel electrode is formed over the TFT substrate. A gate insulating film and an inorganic passivation film are formed in this order thereover. The common electrode having slits is formed over the inorganic passivation film. An alignment film is formed over the common electrode. The source electrode and the pixel electrode of the TFT are connected by way of a through hole formed in the gate insulating film. The columnar spacer is disposed so as to cover the concave portion formed to the TFT substrate due to the presence of the through hole.

(7) The liquid crystal display device described in (6) above in which the diameter at the top end of the columnar spacer is not less than 1.5 times as large as the diameter at the bottom of the concave portion formed to the TFT substrate.

(8) The liquid crystal display device as described in (7) above in which the common electrode is removed at the portion where the columnar spacer is in contact with the TFT substrate and the periphery thereof.

According to the invention, since the area of contact between the columnar spacer and the TFT substrate can be decreased, peeling of the alignment film can be suppressed to prevent generation of bright spots.

In addition, according to the invention, since the area of contact between the columnar spacer and the TFT substrate can be decreased without decreasing the diameter of the columnar spacer, buckling of the columnar spacer can be prevented. Further, since the configuration described above can be practiced without changing the manufacturing process, increase in the manufacturing cost can be suppressed.

DESCRIPTION OF THE PREFERRED EMBODIMENTS

The present invention is to be described specifically by way of preferred embodiments.

[First Embodiment]

Figure 1:
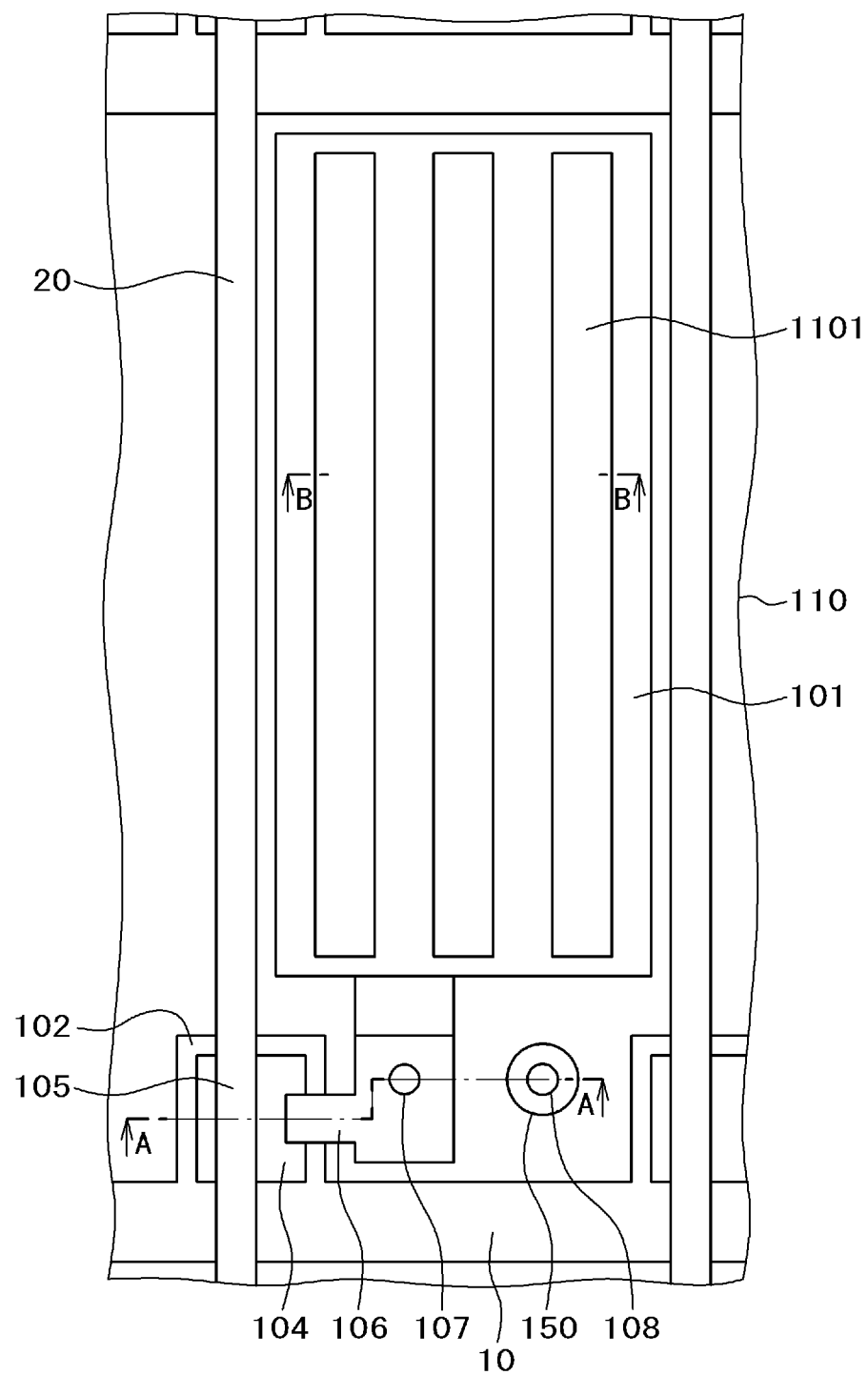
FIG. 1 is a plan view for a pixel portion according to a first embodiment of the invention.
Figure 2:
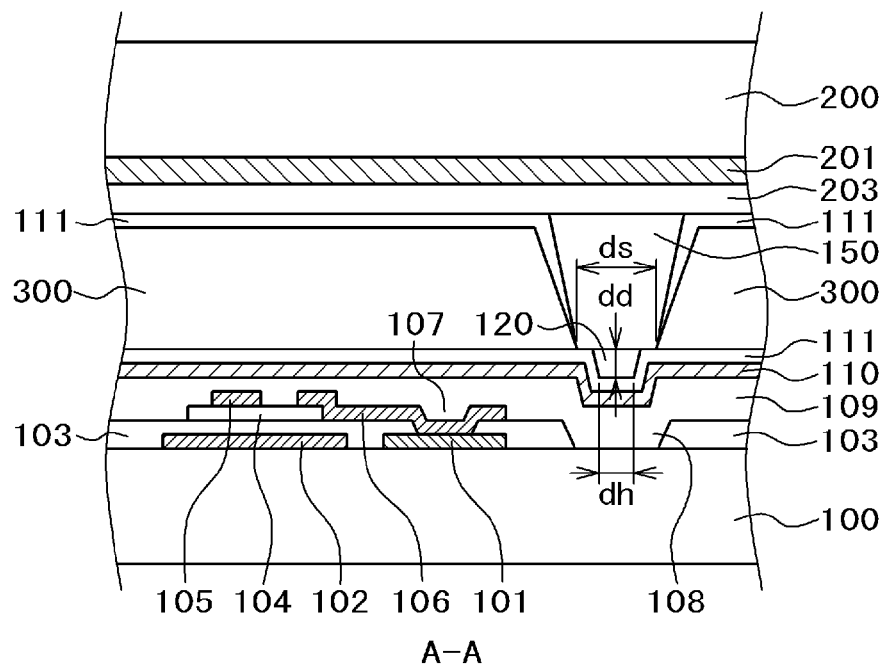
FIG. 2 is a cross sectional view along line A-A in FIG. 1.
Figure 3:
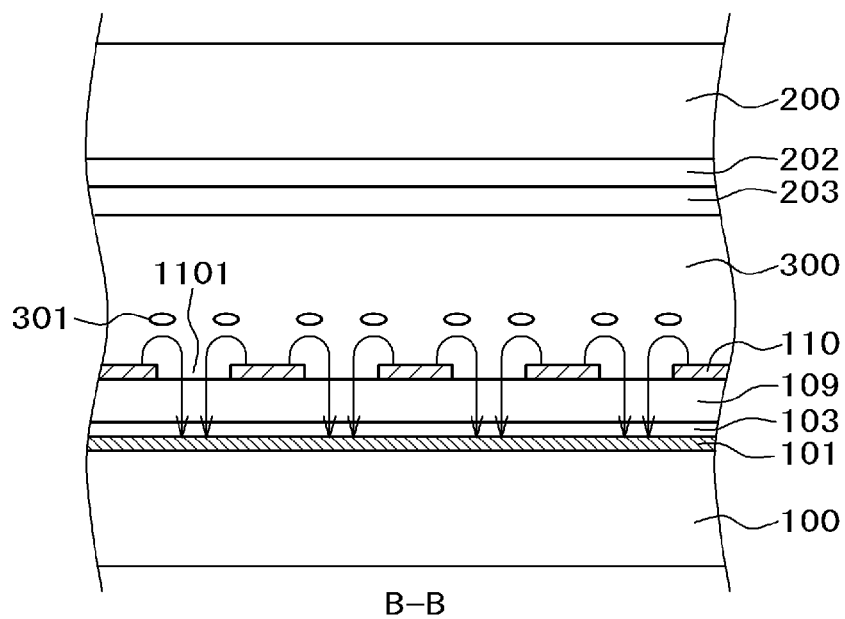
FIG. 3 is a cross sectional view along line B-B in FIG. 1.

FIG. 1 is a plan view for a pixel portion of a liquid crystal display device to which the present invention is applied, FIG. 2 is a cross sectional view along line A-A in FIG. 1, and FIG. 3 is a cross sectional view along a line B-B in FIG. 1. In FIG. 1, gate lines 10 are extended in a lateral direction and arranged in a longitudinal direction. Further, the data lines 20 are extended in the longitudinal direction and arranged in the lateral direction. A pixel electrode 101 is formed in a region surrounded by the gate lines 10 and the data lines 20. The pixel electrode 101 is formed as a solid plane, on which a gate insulating film and an inorganic passivation film not illustrated in FIG. 1 are stacked, and a counter electrode 110 having slits 1101 is arranged thereover. The counter electrode 110 is formed in common with each of the pixels.

FIG. 3 is a cross sectional view along line B-B in FIG. 1 showing the configuration described above. In FIG. 3, a pixel electrode 101 is formed in a solid plane over a TFT substrate 100. A gate insulating film 103 and an inorganic passivation film 109 are stacked thereover. A common electrode 110 having slits 1101 is disposed on an inorganic passivation film 109.

In FIG. 3, a counter substrate 200 is disposed with a liquid crystal layer 300 being sandwiched between the TFT substrate 100 and the counter substrate 200. A color filter 202 is formed on the counter substrate 200, and an overcoat film 203 is formed on the color filter 202. Since FIG. 3 shows the operation principle of the IPS, the alignment film and the columnar spacer are not illustrated. In FIG. 3, when video signals (data signals) are applied to the pixel electrode 101, lines of electric force as shown in the drawing are generated between the pixel electrode 101 and the common electrode 110 including the slits 1101 to rotate liquid crystal molecules 301 and control light transmitted through the liquid crystal layer 300 thereby forming an image.

Referring again to FIG. 1, there are formed a TFT, a first through hole 107 (contact hole 107) connecting a source electrode 106 and the pixel electrode 101 of the TFT, and a second through hole 108 (through hole 108) in the gate insulating film 103 corresponding to a columnar spacer 150 as a feature of the invention to the pixel on the side of the gate line. In the present specification, unless otherwise specified, the first through hole is referred to as a contact hole 107 and the second through hole is referred to simply as a through hole 108 hereinafter. In FIG. 1, a gate electrode 102 is formed being branched from the gate line 10, and a semiconductor layer 104 is formed by way of a gate insulating film 103 over the gate electrode 102. The data lines 20 are extended over the semiconductor layer 104. The data line 20 over the semiconductor layer 104 also serves as a drain electrode 105 of the TFT. A source electrode 106 is formed on the semiconductor layer 104 so as to be disposed in facing relation to the drain electrode 105.

The source electrode 106 is extended in the right direction so as to exceed the semiconductor layer 104 and the gate electrode 102 and overlaps with the pixel electrode 101 extended from the pixel region. The contact hole 107 is formed in the gate insulating film 103 at the overlap portion between the source electrode 106 and the pixel electrode 101, and the source electrode 106 and the pixel electrode 101 are electrically conducted.

In FIG. 1, the through hole 108 is formed in the gate insulating film 103 at a portion where the pixel electrode 101 and the source electrode 106 are not present. A portion of the gate insulating film 103 where the through hole 108 is formed becomes a concave portion 120. That is, when the thickness of the gate insulating film 103 is about 300 nm, the concave portion 120 having a depth of about 300 nm is formed. An inorganic passivation film 109 is formed so as to cover the TFT, the contact hole 107, the through hole 108, etc.

In FIG. 1, the columnar spacer 150 formed to the counter substrate 200 is arranged so as to cover the concave portion 120 due to the presence of the through hole 108 formed in the gate insulating film 103. That is, the top end of the columnar spacer 150 is not in contact at the entire surface thereof with the alignment film 111 formed to the TFT substrate 100 but is in contact therewith only at the peripheral portion of the top end. Accordingly, since the area of contact between the columnar spacer 150 and the alignment film 111 on the side of the TFT substrate 100 is decreased, the amount of scraping of the alignment film caused by contact with the columnar spacer 150 can be decreased.

FIG. 2 is a cross sectional view along line A-A in FIG. 1. In FIG. 2, a gate electrode 102 branched from the gate line 10 is formed over the TFT substrate 100. Further, the pixel electrode 101 extended from the pixel region is formed in the same layer as that of the gate electrode. The gate insulating film 103 is formed covering the gate electrode 102 and the pixel electrode 101. The semiconductor layer 104 is formed over the gate electrode 102 while putting the gate insulating film 103 therebetween. The drain electrode 105 and the source electrode 106 are arranged in facing relation to each other over the semiconductor layer 104. The source electrode 106 is extended as far as a region overlapping with the pixel electrode 101. The contact hole 107 is formed in the gate insulating film 103 at the overlapped portion between the source electrode 106 and the pixel electrode 101, and the source electrode 106 and the pixel electrode 101 are connected through the contact hole 107.

An inorganic passivation film 109 comprising SiN is formed so as to cover the TFT formed in this manner. A common electrode 110 is formed on the inorganic passivation film 109. Although slits 1101 are formed to the common electrode 110 in a pixel region as shown in FIG. 1, this is shown as a continuous solid film in the region shown in FIG. 2.

The through hole 108 is formed in the gate insulating film 103 in a portion on the right of FIG. 2 where the pixel electrode 101 is not present. The inorganic passivation film 109 is formed in the through hole 108, the common electrode 110 is formed on the inorganic passivation film 109, and, further, an alignment film 111 is formed thereover. Due to the presence of the through hole 108 formed in the gate insulating film 103, a concave portion 120 is formed in the surface where the alignment film 111 is formed.

In FIG. 2, a counter substrate 200 is formed with the liquid crystal layer 300 interposed between the counter substrate 200 and the TFT substrate 100. A black matrix 201 is formed on the counter substrate 200, and an overcoat film 203 is formed on the black matrix 201. In the pixel region, while a color filter 202 is formed as shown in FIG. 3, a black matrix 201 is formed for shielding light in the region of FIG. 2.

A columnar spacer 150 is formed on the overcoat film 203. The columnar spacer 150 is formed on the overcoat film 203, for example, by coating an acrylic resin and patterning the coated resin by photolithography. An alignment film 111 is formed so as to cover the overcoat film 203 and the columnar spacer 150. As shown in FIG. 2, a gap between the TFT substrate 100 and the counter substrate 200 is defined by the columnar spacer 150.

As shown in FIG. 2, the columnar spacer 150 is in contact with the TFT substrate 100 so as to cover the concave portion 120 formed by the through hole 108 in the gate insulating film 103 on the side of the TFT substrate 100. That is, the columnar spacer 150 covers the concave portion 120 formed to the TFT substrate 100 but it is in contact with the TFT substrate 100 only at the peripheral portion of the concave portion 120. Accordingly, the area in which the columnar spacer 150 is in contact with the TFT substrate 100 is decreased and the probability that the alignment film 111 is scraped is decreased by so much as the area is decreased. That is, occurrence of bright spots caused by scraping of the alignment film is also suppressed.

The size of the concave portion 120 and that of the top end of the columnar spacer 150 in FIG. 2 are, for example, as below. The diameter dh at the bottom of the concave portion 120 is 4 μm to 10 μm, the diameter ds at the top end of the columnar spacer 150 is 6 μm to 20 μm, and the depth dd of the concave portion 120 is 200 nm to 550 nm. Further, it is necessary that the size ds at the top end of the columnar spacer 150 is formed larger than the diameter dh at the bottom of the concave portion 120 and it is preferably: ds≥1.5 dh. This is determined by considering the bonding accuracy upon bonding the TFT substrate 100 and the counter substrate 200.

The present invention as shown in FIG. 2 has other advantage that the thickness of the alignment film 111 at the periphery of the concave portions 120 can be decreased to less than that of other portion. That is, the material of the alignment film is coated, originally, in a liquid state by flexographic printing, etc. Then, the liquid at the periphery of the concave portion 120 flows into the concave portion 120, so that the thickness of the alignment film 111 tends to be decreased at the periphery of the concave portion 120. That is, the thickness of the alignment film 111 can be reduced at a portion in contact with the columnar spacer 150 than other portions, and the amount of scraped alignment film can be decreased by so much.

In the present invention, when the contact hole 107 for connecting the source electrode 106 and the pixel electrode 101 is formed, the through hole 108 for forming the concave portion 120 can be formed simultaneously in the gate insulating film 103. Thus, the manufacturing process does not increase. Accordingly, occurrence of bright spots can be suppressed without increasing the manufacturing cost.

Further, the invention has a feature that the scraping of the alignment film can be suppressed by decreasing the area of contact between the columnar spacer 150 and the TFT substrate 100. Although the area of contact between the columnar spacer 150 and the TFT substrate 100 may be decreased also by simply decreasing the diameter of the columnar spacer 150, in such a case, the strength of the columnar spacer 150 is decreased. Thus, there is a high possibility of buckling the columnar spacer 150 which results in a problem in view of reliability. On the contrary, according to the invention, since the area of contact between the columnar spacer 150 and the TFT substrate 100 can be decreased without decreasing the diameter of the columnar spacer 150, occurrence of bright spots can be suppressed without deteriorating the reliability.

[Second Embodiment]

Figure 4:
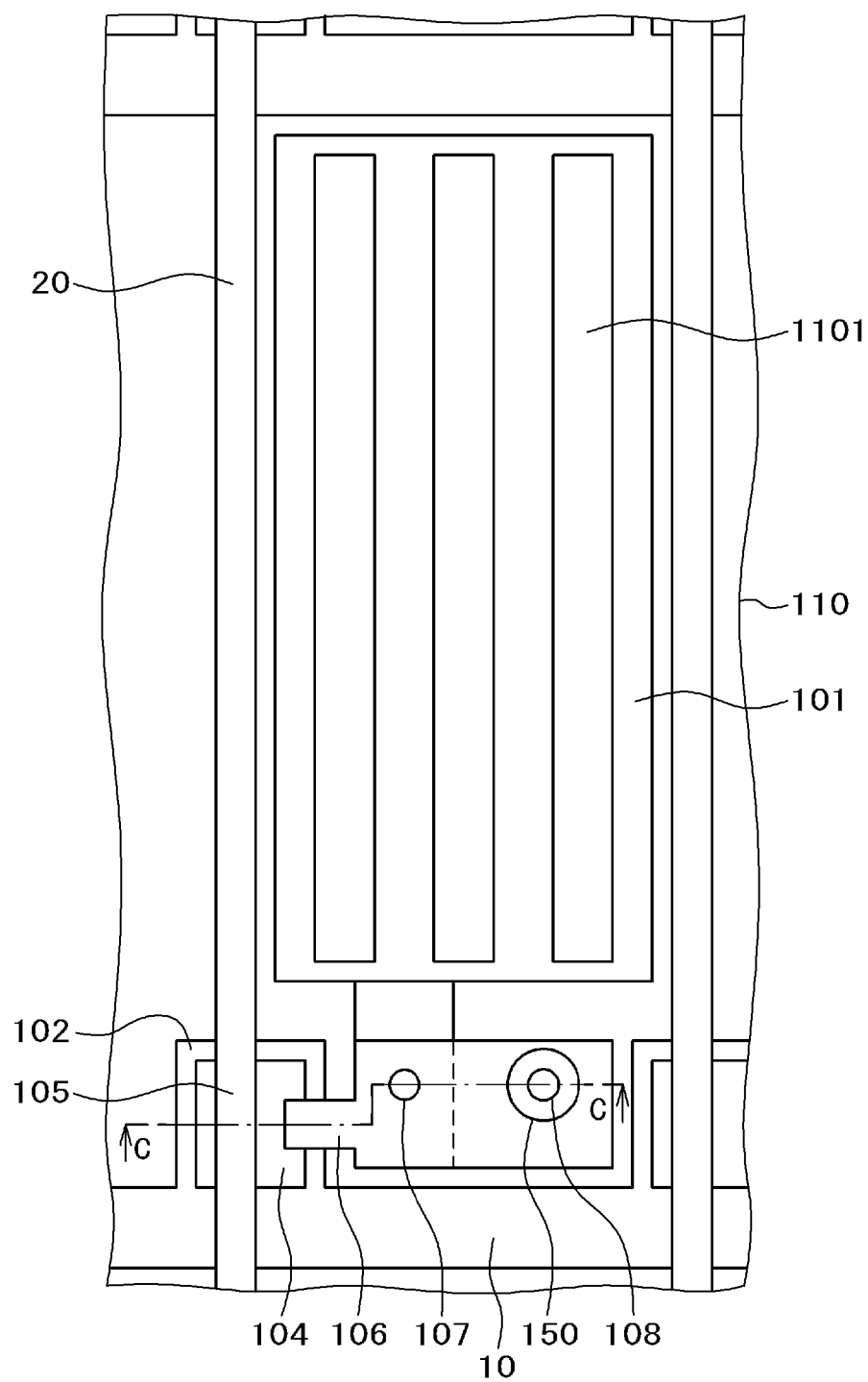
FIG. 4 is a plan view for a pixel portion according to a second embodiment of the invention.

FIG. 4 is a plan view showing a second embodiment of the invention. In FIG. 4, compared with FIG. 1 of the first embodiment, a source electrode 106 is extended longer in the right direction and formed as far as the through hole 108 in the gate insulating film 103 formed corresponding to the columnar spacer 150. Other configurations in FIG. 4 are identical with those of FIG. 1.

Figure 5:
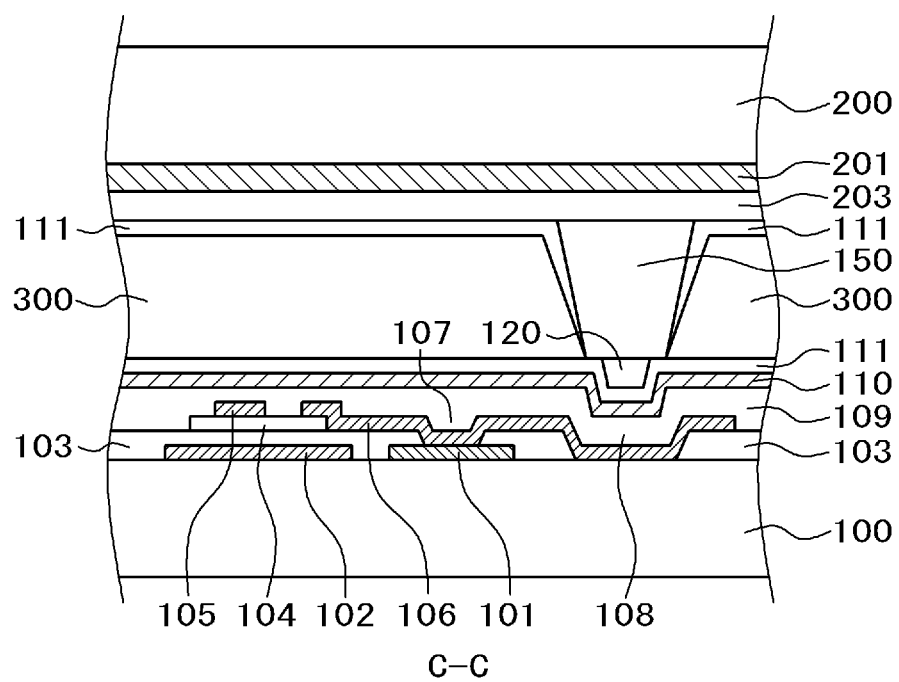
FIG. 5 is a cross sectional view along line C-C in FIG. 4.

FIG. 5 is a cross sectional view along line C-C in FIG. 4. FIG. 4 is different from FIG. 2 for the first embodiment in that a source electrode 106 is extended covering the portion of the through hole 108 in the gate insulating film 103 which is formed corresponding to the columnar spacer 150. In the configuration of FIG. 5, the source electrode 106 and an inorganic passivation film 109 are present in the through hole 108 which is formed in the gate insulating film 103. Presence or absence of the source electrode 106 formed in the through hole portion 108 can be utilized for controlling the depth of the concave portion 120 to be formed. The size of the concave portion 120 in FIG. 5 is also the same as the size exemplified in FIG. 2. Also in this embodiment, electrodes such as the pixel electrode 101 are not formed below the gate insulating film 103 at the periphery of the through hole 108 formed in the gate insulating film 103.

[Third Embodiment]

Figure 6:
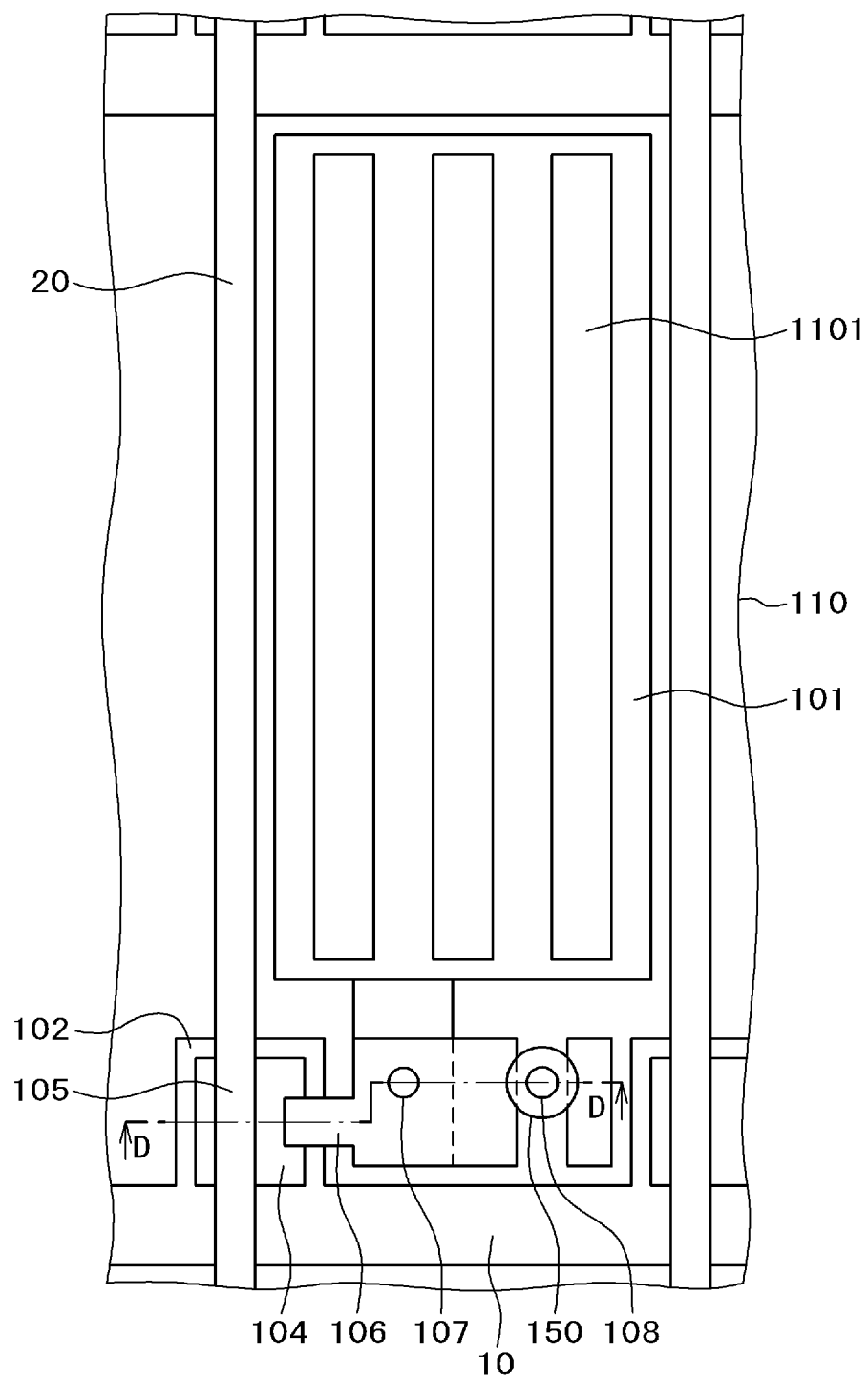
FIG. 6 is a plan view for a pixel portion according to a third embodiment of the invention.

FIG. 6 is a plan view showing a third embodiment of the invention. In FIG. 6, compared with FIG. 1 for the first embodiment, a source electrode 106 is extended in the right direction and is formed as far as the end of a through hole 108 in a gate insulation film 103 formed corresponding to a columnar spacer 150, and a metal film formed simultaneously with the source electrode 106 is formed also on the side opposite to the through hole 108. However, the source electrode 106 is not formed inside the through hole 108.

Figure 7:
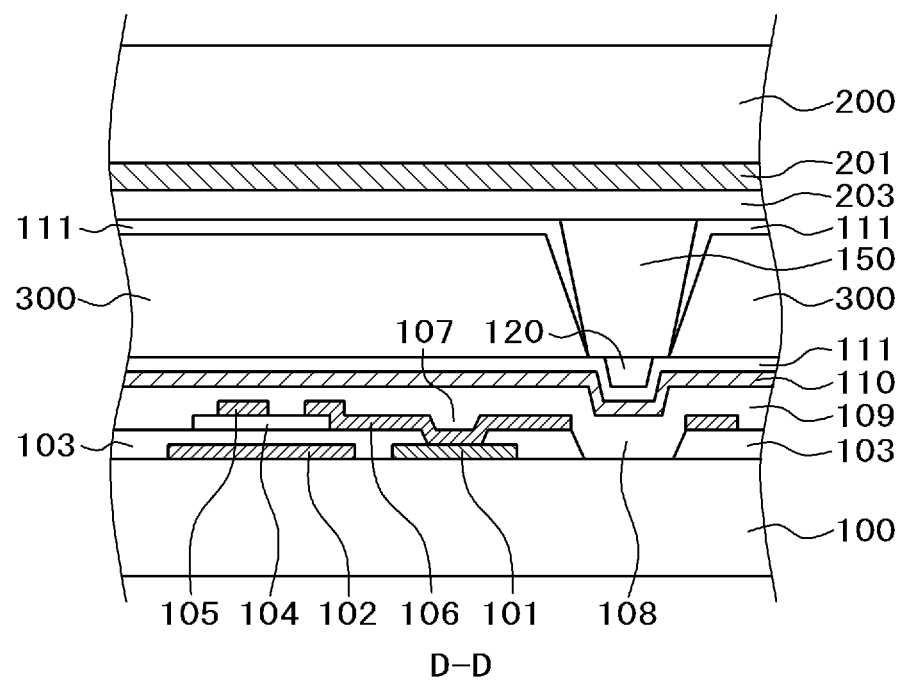
FIG. 7 is a cross sectional view along line D-D in FIG. 6.

FIG. 7 is a cross sectional view along line D-D in FIG. 6. FIG. 7 is different from FIG. 2 of the first embodiment in that the source electrode 106 is extended as far as the end of the through hole 108, and a metal film formed simultaneously with the source electrode 106 is formed at the surface of the gate insulating film 103 on the other side of the through hole 108. As shown in FIG. 7, the gate electrode 106 is not formed inside the through hole 108.

The configuration shown in FIG. 7 has a feature that the depth of the concave portion 120 due to the presence of the through hole 108 formed in the gate insulating film 103 can be increased more by so much as the film thickness of the source electrode 106 than the depth in the configuration of the first embodiment or the second embodiment. Since the configuration in which the source electrode 106 is left on both sides of the through hole 108 formed in the gate insulating film 103 in FIG. 7 can be practiced simultaneously with the formation of the source electrode 106, the drain electrode 105, etc., the manufacturing cost does not increase.

As described above according to this embodiment, the area of contact between the columnar spacer 150 and the TFT substrate 100 can be decreased, and the depth of the concave portion 120 formed by the through hole 108 in the gate insulating film 103 can be made larger. Therefore, the advantageous effect of the invention can be attained more distinctively.

[Fourth Embodiment]

Figure 8:
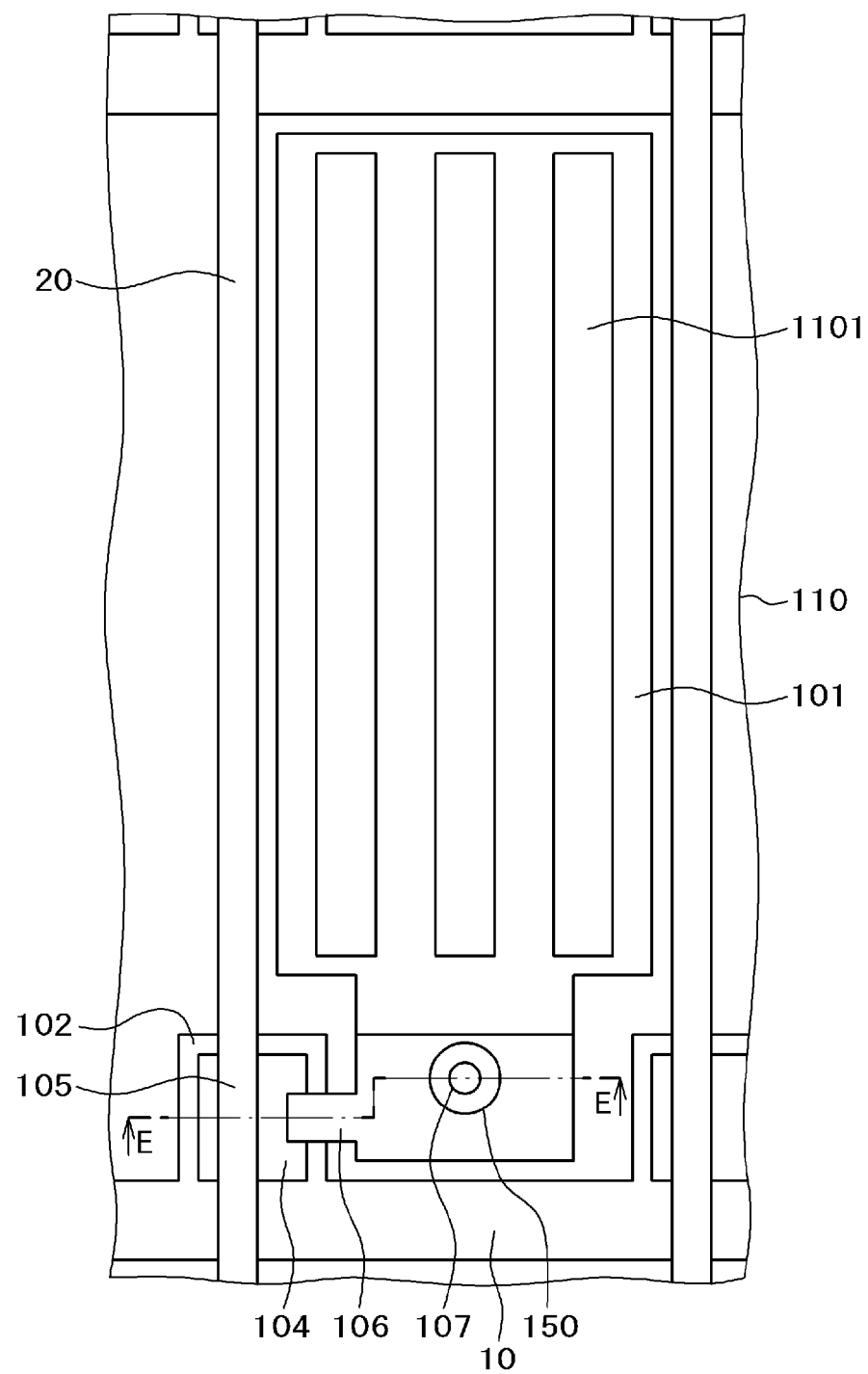
FIG. 8 is a plan view for a pixel portion according to a fourth embodiment of the invention.

FIG. 8 shows a fourth embodiment of the invention. This embodiment is different from the first to third embodiments in that a contact hole 107 connecting a source electrode 106 of a TFT and a pixel electrode 101 also serves as a through hole formed in a gate insulating film 103, the through hole adapted to decrease the area of contact between the columnar spacer 150 and the TFT substrate 100.

In FIG. 8, the source electrode 106 of the TFT is extended in the right direction and overlaps with a pixel electrode 101. The contact hole 107 for connecting the source electrode 106 and the pixel electrode 101 are formed in this portion. The contact hole 107 is formed larger than the contact hole 107 of the first to third embodiments and is almost equal in diameter to the through hole 108 in FIG. 2, etc.

Figure 9:
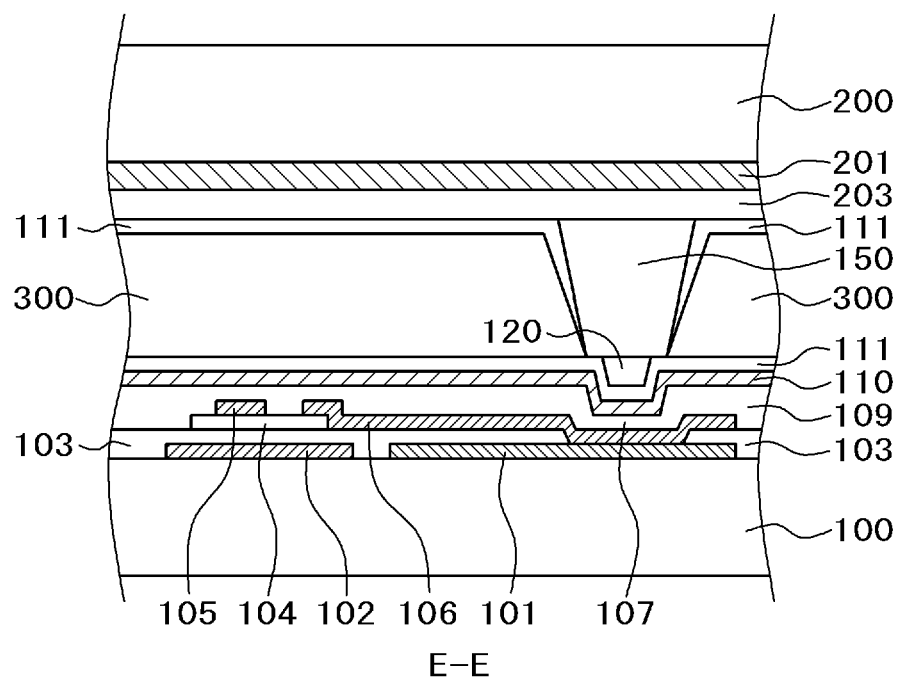
FIG. 9 is a cross sectional view along line E-E in FIG. 8.

FIG. 9 is a cross sectional view along a line E-E in FIG. 8. In FIG. 9, the source electrode 106 of the TFT is extended in the right direction and present as far as a portion below the contact hole 107 formed in the gate insulating film 103 and connected to the pixel electrode 101. The contact hole 107 in FIG. 9 is larger than the contact hole 107 in FIG. 2, etc. A concave portion 120 is formed by the contact hole 107 formed in the gate insulating film 103, and the columnar spacer 150 is in contact with the TFT substrate 100 only at the periphery of the concave portion 120.

Accordingly, the area of contact between the columnar spacer 150 and the TFT substrate 100 can be decreased and occurrence of bright spots caused by scraping of the alignment film can be suppressed. Since it is not necessary in the configuration of this embodiment to provide both the contact hole 107 and the through hole, this is suitable to the configuration of a screen having small pixels and high fineness.

[Fifth Embodiment]

In the constitution of the fourth embodiment, the source electrode 106 is formed at the bottom of the contact hole 107 formed in the gate insulating film 103, and the common electrode 110 is formed on the inorganic passivation film 109 in the contact hole 107. Although the common electrode 110 and the source electrode 106 are insulated from each other by the inorganic passivation film 109, when a pressure is exerted on the counter substrate 200, etc., there may be a possibility that the inorganic passivation film 109 is fractured by the columnar spacer 150. If the inorganic passivation film 109 is fractured, the common electrode 110 and the source electrode 106, that is, the pixel electrode 101 are electrically conducted. Thus, the pixel in the fractured portion is deteriorated.

Figure 10:
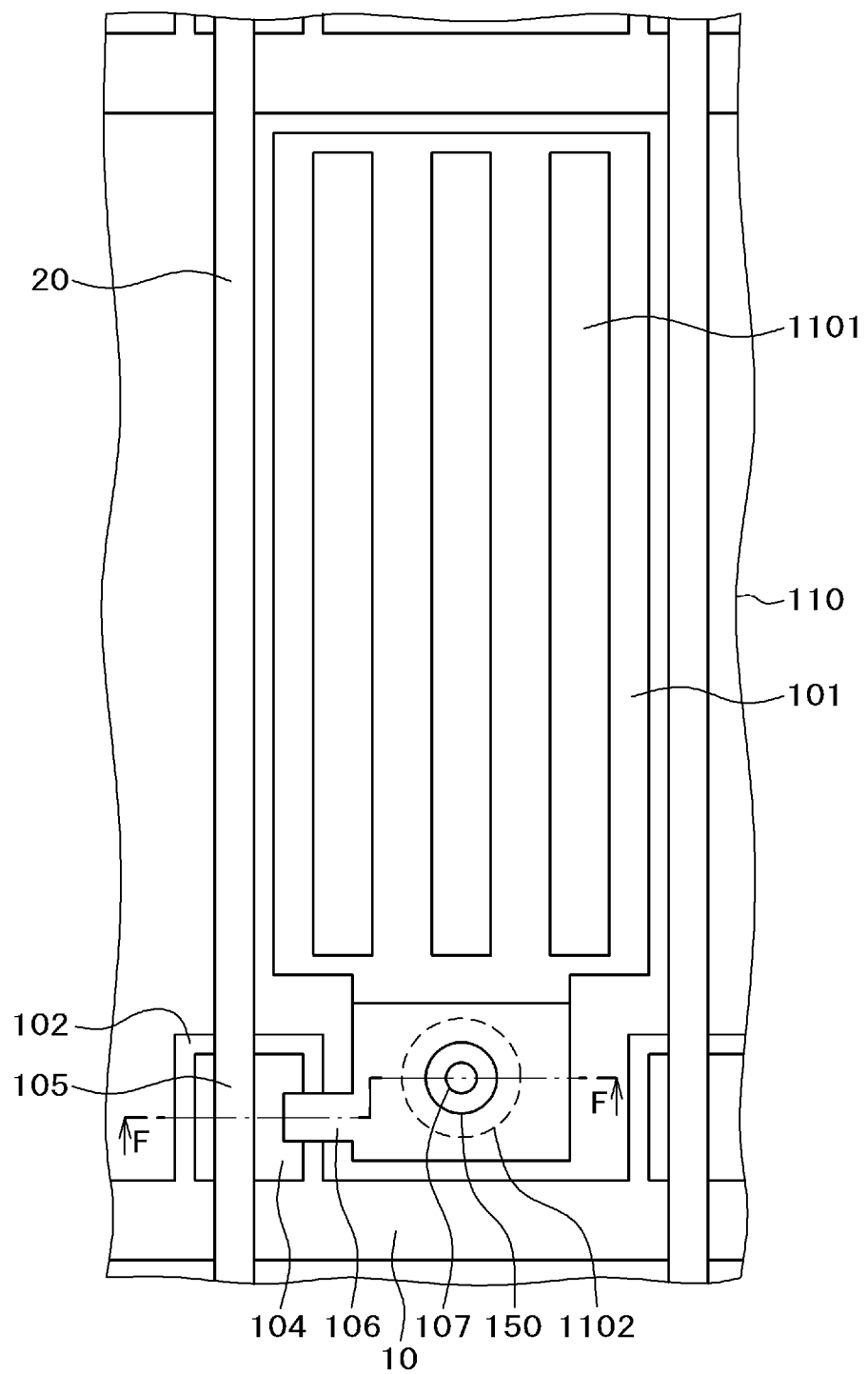
FIG. 10 is a plan view for a pixel portion according to a fifth embodiment of the invention.

FIG. 10 is a plan view of this embodiment taking countermeasures to the problem described above. The embodiment of FIG. 10 is different from that of FIG. 8 as the fourth embodiment in that the periphery of the common electrode 110 in contact with the columnar spacer 150 is removed in the TFT substrate. That is, an area inside the portion shown by a dotted line in FIG. 10 is a common electrode-removed portion 1102 where the common electrode 110 is not present. However, since the common electrode 110 is formed over the entire surface except for the slit portion 1101, there is no problem for electric conduction of the common electrode 110.

Figure 11:
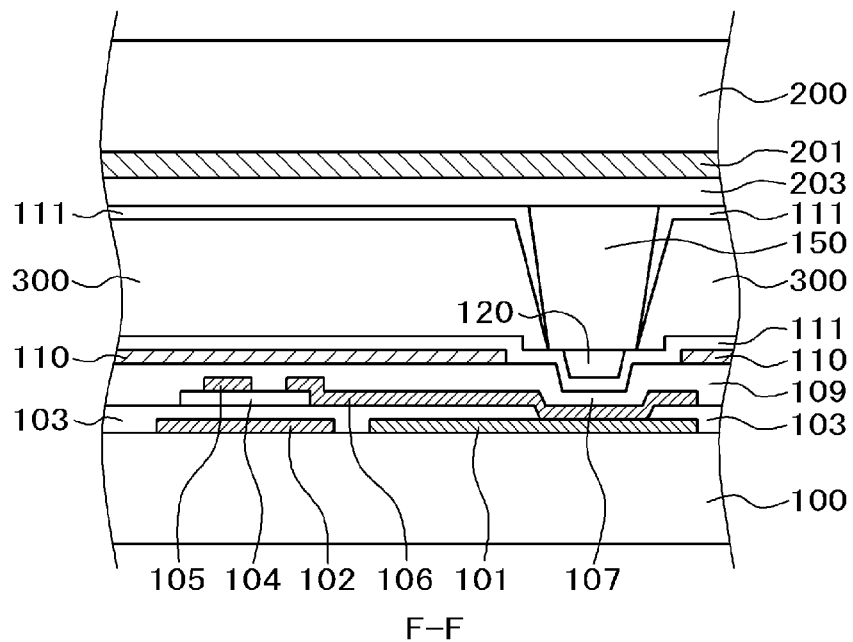
FIG. 11 is a cross sectional view along line F-F in FIG. 10.
Figure 12:
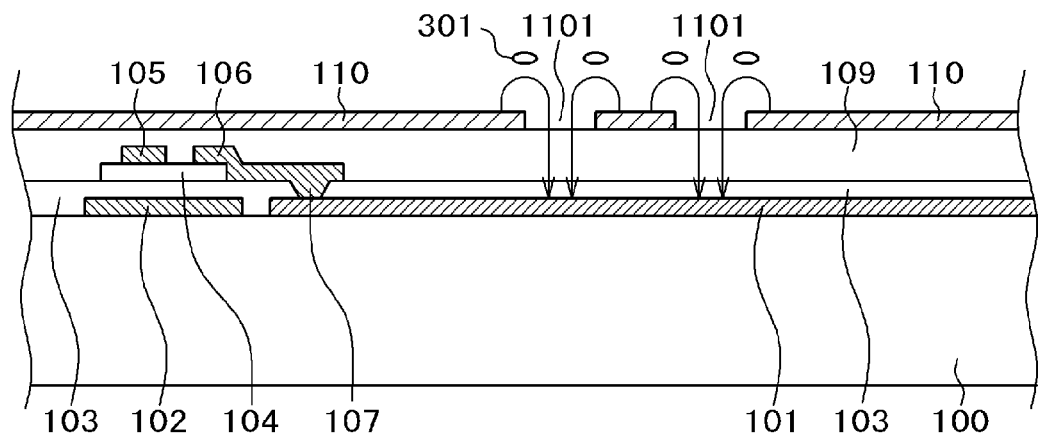
FIG. 12 is a cross sectional view showing the operation of an IPS system.

FIG. 11 is a cross sectional view along line F-F in FIG. 10. In FIG. 11, the common electrode 110 is removed from the periphery of the columnar spacer 150. According to this configuration, even if a stress is generated in the columnar spacer 150 by pressure, impact shock, etc. from the outside to fracture the inorganic passivation film 109, undesired electric conduction between the common electrode 110 and the source electrode 106 or the pixel electrode 101 can be prevented. Accordingly, the effect of the invention can be attained at higher reliability.

The configuration of the through hole 108 in the second embodiment also involves a possibility that electric conduction between the common electrode 110 and the source electrode 106 is occurred by the fracture of the inorganic passivation film 109 caused by pressure or impact shock from the outside. For preventing such a possibility, electric conduction between the common electrode 110 and the source electrode 106 can be avoided also in the second embodiment by the configuration of removing the common electrode 110 from the periphery of the columnar spacer 150.

What is claimed is:

1. A liquid crystal display device comprising:
   a TFT substrate having pixels formed in a matrix, the pixels each including a pixel electrode, a common electrode and a TFT;
   a counter substrate;
   a liquid crystal layer put between the TFT substrate and the counter substrate; and
   a columnar spacer formed to the counter substrate, the columnar spacer adapted to define a gap between the TFT substrate and the counter substrate, wherein
   the pixel electrode is formed on the TFT substrate,
   a gate insulating film and an inorganic passivation film are formed in this order thereover,
   the common electrode having slits is formed over the inorganic passivation film,
   an alignment film is formed over the common electrode,
   the source electrode and the pixel electrode of the TFT are connected by way of a first through hole formed in the gate insulating film,
   a second through hole is formed in the gate insulating film at a portion where the columnar spacer is in contact with the TFT substrate, and
   the top end of the columnar spacer is disposed so as to cover a concave portion formed to the TFT substrate by the second through hole.

2. The liquid crystal display device according to claim 1, wherein
   an electrode is not present below the gate insulating film at the periphery of the second through hole.

3. The liquid crystal display device according to claim 2, wherein
   the diameter at the top end of the columnar spacer is not less than 1.5 times as large as the diameter at the bottom of the concave portion formed to the TFT substrate.

4. The liquid crystal display device according to claim 3, wherein
   the source electrode and the inorganic passivation film are present in the second through hole.

5. The liquid crystal display device according to claim 3, wherein
   the source electrode is not present inside the second through hole and the source electrode is present at the periphery of the upper end of the through hole.

* * * * *